US012097493B2

(12) United States Patent
Pfeiffer et al.

(10) Patent No.: US 12,097,493 B2
(45) Date of Patent: Sep. 24, 2024

(54) KIT INCLUDING PLANAR SAMPLE CARRIER WITH ABSORBENT MEMBRANE LAYER AND BOX

(71) Applicant: EUROIMMUN Medizinische Labordiagnostika AG, Lübeck (DE)

(72) Inventors: Thomas Pfeiffer, Lübeck (DE); Stephan Proost, Lübeck (DE); Lisa Honold, Lübeck (DE)

(73) Assignee: EUROIMMUN Medizinische Labordiagnostika AG, Lübeck (DE)

(*) Notice: Subject to any disclaimer, the term of this patent is extended or adjusted under 35 U.S.C. 154(b) by 704 days.

(21) Appl. No.: 17/369,950

(22) Filed: Jul. 7, 2021

(65) Prior Publication Data

US 2022/0008912 A1 Jan. 13, 2022

(30) Foreign Application Priority Data

Jul. 7, 2020 (EP) .................................... 20184526

(51) Int. Cl.
*B01L 3/00* (2006.01)
*B01L 9/00* (2006.01)

(52) U.S. Cl.
CPC ............... *B01L 3/5023* (2013.01); *B01L 9/52* (2013.01); *B01L 2300/021* (2013.01); *B01L 2300/069* (2013.01); *B01L 2300/0809* (2013.01)

(58) Field of Classification Search
CPC .... B01L 3/5023; B01L 9/52; B01L 2300/021; B01L 2300/069; B01L 2300/0809;
(Continued)

(56) References Cited

U.S. PATENT DOCUMENTS 5,783,759 A 7/1998 Wielinger et al.
9,352,863 B1 5/2016 Bishop et al.
(Continued)

FOREIGN PATENT DOCUMENTS

GB 2558612 A 7/2018

OTHER PUBLICATIONS

Grüner, N. et al., "Dried Blood Spots—Preparing and Processing for Use in Immunoassays and in Molecular Techniques," Mar. 13, 2015, J. Vis. Exp. 97, 52619.

*Primary Examiner* — Dennis White
(74) *Attorney, Agent, or Firm* — Bochner PLLC; Andrew D. Bochner

(57) ABSTRACT

A kit or set including a planar sample carrier having an absorbent membrane layer suitable for absorbing liquid blood components is provided, and wherein at least a portion of the blood components is able to dry in the membrane layer, wherein the sample carrier is additionally provided on an outer side with an optically readable code, additionally including a closable cuboidal box having a bottom surface that has a rectangular base surface and that additionally has a first opening, additionally including a planar receiving element having a base surface that corresponds to the base surface of the bottom surface, wherein the receiving element has a second opening and a holder that together are designed such that, on mounting the sample carrier in the holder and subsequently inserting the receiving element into the box on the bottom surface of the box, the optical code is visible through the first opening in the bottom surface and also through the second opening in the receiving element.

13 Claims, 14 Drawing Sheets

(58) Field of Classification Search
CPC ............. B01L 3/5055; B01L 2200/185; B01L 2300/0825; B01L 3/54; B65D 5/4204; B65D 5/22; B65D 5/4212; B65D 5/6664; B65D 2203/06
See application file for complete search history.

(56) References Cited

U.S. PATENT DOCUMENTS

| | | | | |
|---|---|---|---|---|
| 2005/0000841 | A1* | 1/2005 | DuBois ..................... | B01L 9/06 206/570 |
| 2014/0373645 | A1 | 12/2014 | Bedrio | |
| 2016/0151780 | A1 | 6/2016 | Herbst et al. | |

* cited by examiner

KIT INCLUDING PLANAR SAMPLE CARRIER WITH ABSORBENT MEMBRANE LAYER AND BOX

CROSS-REFERENCE TO RELATED APPLICATIONS

The present application claims priority pursuant to 35 U.S.C. § 119(a) to EP patent application 20184526.0, filed Jul. 7, 2020, which is incorporated by reference herein in its entirety.

BACKGROUND

This specification relates to a kit including a planar sample carrier having an absorbent membrane layer and a box.

From the prior art, sample carriers are known that have an absorbent membrane layer that is in turn suitable for absorbing liquid blood components such that said blood components are able to dry in the membrane layer. Sample carriers of this type are sometimes also referred to as dried-blood spot (DBS) cards. Such sample carriers are normally used in order that blood, especially capillary blood, of a patient can be taken from said patient and the blood is able to dry as a patient sample on the membrane layer of the sample carrier. Such a dried blood sample or such dried blood components can then be sent by means of the sample carrier from the collection site, preferably by means of a shipping bag or a shipping envelope, to a diagnostic laboratory. In the laboratory, the part-areas of the membrane layer containing the blood components are then removed from the whole membrane layer and then supplied to an in-vitro diagnostic procedure. The removed piece of support containing dried blood is commonly referred to as a dried-blood spot or DBS. The principal advantage of using sample carriers having membrane layers for absorbing/drying blood components in the membrane layer and of subsequent shipment is that the patient does not need to have a relatively large volume of a liquid blood sample taken, for example from the vein; instead, it is merely necessary to wait prior to shipment until the blood components have dried in the membrane layer so that the sample carrier can then be sent by post to the laboratory. There is therefore no need for any safety measures to be provided for transport of a liquid blood sample.

For many qualitative determinations in the field of analytics and especially in laboratory diagnostics, all that matters is that the presence or absence of an analyte can be correctly determined, but not the concentration in which it is present in a patient's blood. This is the case for example when the blood sample is being analyzed to establish whether the patient has a metabolic disorder associated with a defective gene. The blood sample then needs to be tested merely to establish whether such a gene is present, but not how much of the genetic material containing the gene is present in the sample.

In the case of other analytes, the concentration in which the analyte occurs in the blood needs to be ascertained because a diagnostic reference concentration range is known. If the concentration of the analyte is within this range, this indicates that the patient is healthy. For such semiquantitative or also purely quantitative determinations, what matters is that the amount or concentration of the analyte is correctly determined.

For the measurement of concentrations of particular analytes in the blood of patients, it is usually venous blood that is taken from the patient, followed by processing of the blood into serum. Besides the unpleasantness of this invasive procedure for the patient and the minor health risks it carries, for example a risk of nausea or fainting, blood can only be taken by a qualified professional such as a doctor, or at least a nurse or experienced laboratory technician. For this, the patient must visit a doctor's practice or a hospital.

The collection of capillary blood is by comparison much simpler and gentler. After pricking the patient's fingertip or earlobe with a sharp object such as a lancet, a few drops of capillary blood are obtained, which are applied to an absorbent sample carrier. As soon as the blood on the carrier has dried, which may take a few hours to complete at room temperature, the carrier can be transported without further processing, very easily by letter post even. Visiting a laboratory or a doctor's practice thereby becomes superfluous. Because the blood sample or blood component have dried, the sample carrier with the sample thereon is no longer considered hazardous material. It is possible to detach a piece of carrier with blood from a carrier with dried-on blood, preferably capillary blood. This can be achieved for example with a device such as the one described in U.S. patent application Ser. No. 14/900,360 or by punching out.

SUMMARY

An object of the present invention is to provide a set or kit for the purpose of absorbing and drying blood components on a membrane layer of a sample carrier that can be handled particularly easily and also particularly safely.

In one embodiment a carrier may be provided for example by a membrane layer that is able to absorb the blood or blood components in a liquid aggregate state and on which the blood or blood components then dry before the carrier is transported in the form of the absorbent membrane.

The blood component absorbed by the membrane may be whole blood, especially capillary blood. Alternatively the blood component may be blood serum or blood plasma.

Usually, the membrane of the sample carrier is placed on a support device or a support area and mechanical force is then applied to the membrane from above by means of a punching device or a punching knife so as to cut a membrane element out of the membrane, it being desirable for the membrane element to then drop through gravity into a vessel positioned beneath the sample carrier/beneath the membrane. This vessel can then be used subsequently for a biochemical analysis.

The term "quantitative determination" is for the purposes of this application understood as meaning a determination that permits a statement on the absolute concentration of the analyte, more preferably with a numerical value. It can alternatively be a semiquantitative determination that allows assignment of the concentration to a range of at least three, possibly four, concentration ranges, e.g. negative, weakly positive and positive, or determination of a relative concentration. In particular, the concentration determination is carried out using calibrators, there being preferably two or more, preferably four, units, preferably solutions or solid analytes coated on a diagnostically useful support, each containing a known amount of the analyte, the two or more units each having a different known amount.

A quantitative determination may be carried out using one or more of the following methods: immunodiffusion, immunoelectrophoresis, light scattering, agglutination and immunoassay with labelling—for example from the group including immunoassay with radiolabeling, with enzymatic labelling, preferably ELISA, with chemiluminescent labelling, preferably electrochemiluminescent labelling and with immunofluorescent labelling, preferably indirect immunofluorescent labelling—preferably with ELISA.

The dried blood component may be eluted out of the punched-out membrane element by contacting the removed/punched-out membrane element with a liquid suitable for absorbing the analyte from the dried blood component. Suitable for this purpose are especially aqueous buffers having an appropriate pH and salt content, for example PBS. The exact composition of the liquid and the conditions and duration of contacting can be ascertained through routine stabilization studies and optimization studies aimed at maximizing uptake of the analyte into the liquid and depend on the nature of the analyte. The chosen liquid is in addition as far as possible one that it is compatible with the subsequently employed method for detecting the analyte. The analyte of interest is then detected in the liquid. The analysis determined whether the analyte is present or absent/is present in a concentration about the detection limit of the employed method of detection. The analyte is preferably determined semi-quantitatively or quantitatively. Various options for the performance of the method are described in the prior art, for example Gruner, N., Stambouli, O. and Ross, R. S. (2015) Dried Blood Spots—Preparing and Processing for Use in Immunoassays and in Molecular Techniques, J. Vis. Exp 97, 52619.

In one embodiment, a set or kit is provided that includes a planar sample carrier having an absorbent membrane layer suitable for absorbing liquid blood components, wherein at least a portion of the blood components is able to dry in the membrane layer. The sample carrier is provided on an outer side with an optically readable code. The set additionally includes a closable cuboidal box having a bottom surface that has a rectangular base surface and that additionally has a first opening. In addition, the set includes a planar receiving element having a base surface that corresponds to the base surface of the bottom surface of the box. The receiving element has a second opening and a holder that together are designed such that, on mounting the sample carrier in the holder and subsequently inserting the receiving element into the box onto the bottom surface of the box, the optical code is visible through the first opening in the bottom surface and also through the second opening in the receiving element.

The membrane layer is preferably a nonwoven fabric. The membrane layer does not necessarily need to be a membrane in the sense of a filter membrane, rather it is sufficient when the membrane has the properties that allow liquid blood components to be absorbed in the membrane layer and that allow at least a portion of said blood components to dry in the membrane layer.

One or more advantages of the invention are now elucidated further by setting out various aspects in more detail.

In order to permit assignment in the laboratory of a sample carrier, and of the blood sample present on the membrane layer thereof, to a particular patient record of a particular patient, the sample carrier is provided on an outer side with a unique optical code. Such an optical code is preferably a barcode, alternatively the code can be a so-called QR code or an optical code made up of readable numbers and/or letters.

Before a laboratory sends out a sample carrier with an individual optical code to a patient or issues one to the patient or for example supplies the sample carrier to a doctor, it is normally necessary for the sample carrier with its unique optical code to first be assigned by the laboratory, by means of the data therein, to a corresponding patient record that indicates the patient uniquely, prior to being sent to the patient. Once the sample carrier with blood sample present thereon has subsequently been returned to the laboratory by the patient and has been received in the laboratory, the sample carrier can then be uniquely assigned to the patient or to the abovementioned patient record on the basis of the code. A planar sample carrier of this type is normally sent to the patient by the laboratory by packing the sample carrier in a box and sending the box to the patient. It is preferable when further objects such as at least one lancet or a shipping bag for returning the sample carrier and also e.g. plasters or alcohol wipes are enclosed with the sample carrier in the box, since such further objects are used for taking the blood sample or blood components from the patient. If, in a laboratory, the sample carrier were to be first picked up by hand by a laboratory worker for shipment to the patient, followed by the optical code being recorded by means of an optical reader and the code then being assigned, by means of the data therein, to a patient record, the laboratory worker would then have to insert the sample carrier into a box and after that close the box and then send it.

Since it is in a laboratory often necessary not only to send individual sample carriers to patients or users such as doctors on individual days or at individual times, but for this possibility to be necessary with greater frequency in larger laboratories, the disclosed embodiments have particular advantages. The box, together with the sample carrier and other objects, can be preassembled at a point in time long before shipment to the patient by inserting the sample carrier into the receiving element/mounting it on the holding device of the receiving element and then inserting the receiving element onto the bottom surface of the box such that a configuration is automatically obtained in which the optical code is visible both through the first opening in the bottom surface and through the second opening in the receiving element. The box can then be closed as part of the preassembly process and initially stored at a storage facility for a certain period of time until the need arises to send or issue a sample carrier to a patient at a later date. It may then be preferable for several such boxes with respective sample carriers to be preassembled and closed and held in stock at the storage facility. When the need subsequently arises to send a sample carrier to a patient or to a user such as a doctor, the laboratory worker in the laboratory can simply take one such preassembled box out of the storage facility and, by virtue of the corresponding openings in the bottom surface of the box and in the receiving element, scan/read the optical code of the sample carrier through these two openings and then immediately and directly assign this, by means of the data therein, to a record/patient record using a computer system that uniquely indicates the patient concerned. Such a patient record is normally provided/communicated to the laboratory in advance, via a means of telecommunication, by the patient him/herself or by a doctor giving treatment, or else generated and saved in a laboratory computer system on the basis of written documentation. The laboratory worker does not need to take the sample carrier out of the box in order to read the code, nor is it necessary for the laboratory worker to preassemble the box with its components him/herself or to enclose in the box further objects that are preferably to be provided, such as a lancet or a shipping bag. The invention thus minimizes the amount of handling by laboratory workers that is needed. It also at the same time ensures that the sample carrier is uniquely identifiable, since the optical code is located directly on the outer side of the sample carrier and can be read/scanned through the openings. The code is normally not necessarily printed again on an outer side of the box. If the code were printed on an outer side of the box or provided as a removable sticker on the box, it would be possible for sample carriers and the associated codes to get mixed up when the whole set is handled during use by the patient or by a doctor, which must be avoided. This is ruled out by the preferably unique code being provided/printed as an optical code directly and immediately on the outer side of the sample carrier. Moreover, after scanning the code through the two openings, the laboratory worker can then save time by simply placing the box/set in a shipping carton in order to send the set, or preferably issue it directly, to a patient or to a user such as a doctor.

In one embodiment, the box can be preassembled and then stored until a patient or the user is to receive the whole set. When a set is needed, the set can be removed from the place of storage and the barcode can be scanned and assigned to a patient record by means of the data therein/by computerized means. This especially advantageous because the sample carrier does not need to be removed from the box again; rather, it can remain in the box after assembly for the period of storage until its removal from the place of storage. The patient or other user, such as a doctor, can then thus subsequently remove the sample carrier from the box and apply drops of his/her blood or of the patient's blood to the sample carrier and then return it to the laboratory once the blood components have dried on the membrane layer. Because the sample carrier is provided with the optical code, the blood sample/blood components present thereon can in the laboratory be uniquely reassigned to the previously provided patient data by scanning the code again, thereby avoiding sample mix-ups. The proposed kit is therefore additionally advantageous in that the base surface of the receiving element and the base surface of the bottom surface correspond to one another, which means that the sample carrier does not need to be correctly positioned and mounted directly on the bottom surface of the box in order to be subsequently able to scan the code through the opening in the bottom surface of the box. Instead, all that is necessary is for the sample carrier to be inserted into the holder of the receiving element or positioned or mounted on it outside the box so that during the assembly process the planar receiving element can then be inserted in a particularly simple manner into the open box onto the bottom surface of the box, the corresponding openings in the receiving element and in the bottom surface of the box ensuring that the optical code is automatically positioned such that it is visible through these two openings and can subsequently be correctly scanned.

If assembly were to be provided in a different manner in which the sample carrier had to be mounted directly in the bottom surface of the box/carton by means of, for example, an adhesive process such as two adhesive dots, a person would have to reach inside the box/carton with his/her hands during the assembly process and position the sample carrier correctly therein within the spatially confined inner space. Because the set according to the invention provides a separate receiving element having a separate holder for the sample carrier, a user can—during the assembly process—work outside the interior of the box/outside the carton and insert the sample carrier into the holder or mount it thereon, for which he then accordingly has more available space in which to work than would be the case if he/she had to mount the sample carrier directly on the bottom surface of the carton inside the carton. The fact that the base surface of the receiving element corresponds to the base surface of the bottom surface of the box/carton means that, when the sample carrier is mounted in/on the receiving element and the receiving element is inserted into the box onto its bottom surface, the sample carrier will automatically be correctly aligned not only in relation to the opening in the receiving element, but also in relation to the opening in the bottom surface of the box. These base surfaces preferably have the same geometry and, more particularly, these base surfaces have the same respective surface dimensions apart from a deviation of max. 10%, preferably max. 5%. If, during the assembly process, the sample carrier is already in the holder of the receiving element, this means that the receiving element then only has to be inserted into the box, for which the user can rely on gravity, since this then pulls the receiving element down onto the bottom surface of the box/carton. This permits a time-efficient and less laborious assembly of the set than would be the case if the sample carrier had to be mounted directly on the bottom surface of the box/carton.

Advantageous embodiments of the invention are provided by the dependent claims and are elucidated in more detail in the description that follows, with reference in part to the figures.

Preferably, the cuboidal box is made up of a cuboidal carton and of a sleeve or a lid, wherein the cuboidal carton is open on its upper side and wherein the cuboidal carton can be closed through the sleeve or the lid.

Preferably, the box is a slide-in box made up of a slide-in carton and of a slide-in sleeve, wherein the slide-in sleeve has a third opening that corresponds to the first opening and to the second opening such that, on mounting the sample carrier in the holder, subsequently inserting the receiving element into the slide-in carton on its bottom surface and subsequently sliding the slide-in carton into the slide-in sleeve, the optical code is visible through the first opening in the bottom surface, through the second opening in the receiving element and through the third opening in the slide-in sleeve.

Preferably, the sample carrier includes a main body, wherein the membrane layer is mounted on the main body, and wherein the main body is also provided on an outer side with the optically readable code.

Preferably, the membrane layer is a planar membrane layer, wherein the main body is a planar main body that is foldable such that the membrane layer is covered by the folded main body.

Preferably, the holder permits a mechanically reversible mounting of the sample carrier in the holder such that the sample carrier may be removed again from the holder without mechanical damage.

Preferably, the sample carrier has a rectangular base surface, wherein the holder is made up of at least two punched holes in the receiving element, into which can be tucked respective opposite corners of the sample carrier.

Preferably, the first opening is arranged symmetrically about a central point on the base surface of the bottom surface, in particular a geometric central point, wherein the second opening is arranged symmetrically about a central point on the base surface of the receiving element, in particular a geometric central point, and wherein the base surface of the bottom surface and the base surface of the receiving element are both rectangular, but not square.

Preferably, the set additionally includes at least one lancet and at least one shipping bag for shipment of the sample carrier.

Preferably, the set additionally includes a shipping carton/shipping box, preferably in the form of a flip-top box into which the abovementioned box can be inserted.

Preferably, the shipping carton has a fourth opening on its underside or its upper side that corresponds to the first opening and the second opening and also preferably the third opening. Preferably, the code is positioned centrally about a central point on the base surface of the sample carrier and of the folded-up sample carrier, in particular a geometric central point.

Also proposed is a set according to the invention, wherein the sample carrier is inserted into the receiving element/mounted thereto, wherein in addition the receiving element is inserted into the box, wherein the box is closed and wherein the box preferably includes in its interior at least one lancet and in particular at least one shipping bag. Preferably, the set is packed in a shipping carton that is, in turn, preferably closed.

BRIEF DESCRIPTION OF THE DRAWINGS

The invention is elucidated in more detail hereinbelow with reference to the figures and with reference to specific embodiments, but without limitation to the general inventive concept. In the figures.

In the description of the attached figures that follows, which show only some exemplary embodiments, the same reference symbols may denote identical or comparable components. In addition, summarizing reference symbols may be used for components and objects that appear multiple times in an exemplary embodiment or in a drawing, but are described together in respect of one or more features. Components or objects described with the same or summarizing reference symbols may be identical in respect of one or more or all features, for example their dimensions, but may possibly also be designed differently, unless the description explicitly or implicitly indicates otherwise. Optional components are indicated in the figures by dashed lines or arrows.

Although exemplary embodiments may be modified and altered in various ways, exemplary embodiments are illustrated in the figures as examples and described in detail herein. It should, however, be clarified that the intention is not to limit exemplary embodiments to the forms disclosed in each case, but rather that exemplary embodiments are intended to cover all functional and/or structural modifications, equivalents and alternatives that come within the scope of the invention. Identical reference symbols denote identical or similar elements throughout the description in the figures.

DETAILED DESCRIPTION

Unless otherwise defined, all terms used herein (including technical and scientific terms) have the same meaning that is attributed to them by an average person skilled in the art associated with the exemplary embodiments. It should also be clarified that expressions, for example ones defined in commonly used dictionaries, are to be interpreted as having the meaning consistent with their meaning in the context of the relevant technology and are not to be interpreted in an idealized or overly formal sense unless expressly specified herein.

Figure 1A:
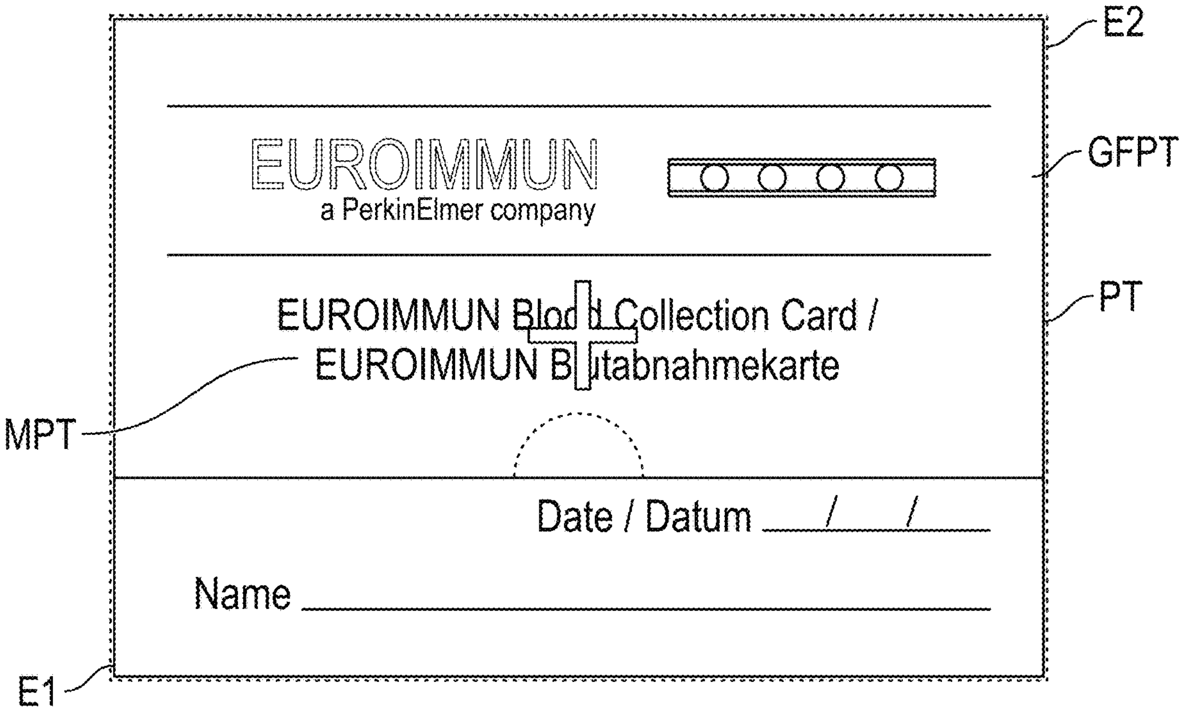
FIG. 1*a* shows a view of a preferred embodiment of a sample carrier.

FIG. 1*a* shows a planar sample carrier PT having a base surface GFPT and opposite corners E1, E2. The base surface GFPT has a central point MPT that is indicated by a cross. The base surface GFPT of the sample carrier PT is preferably rectangular, but not square.

Figure 1B:
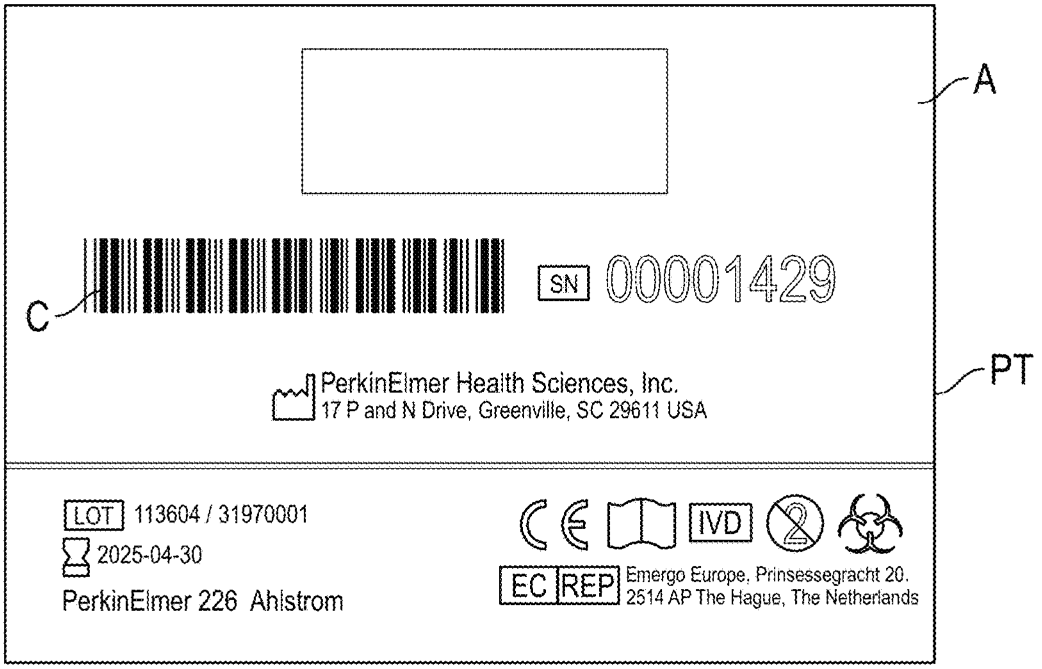
FIG. 1*b* shows a rear view of the sample carrier depicted in FIG. 1*a* with an optical code.

FIG. 1*b* shows the sample carrier PT from its reverse side A, which can also be referred to as the outer side A. On the outer side A, the sample carrier PT has an optically readable code C/this code C is printed on the outer side A.

Figure 1C:
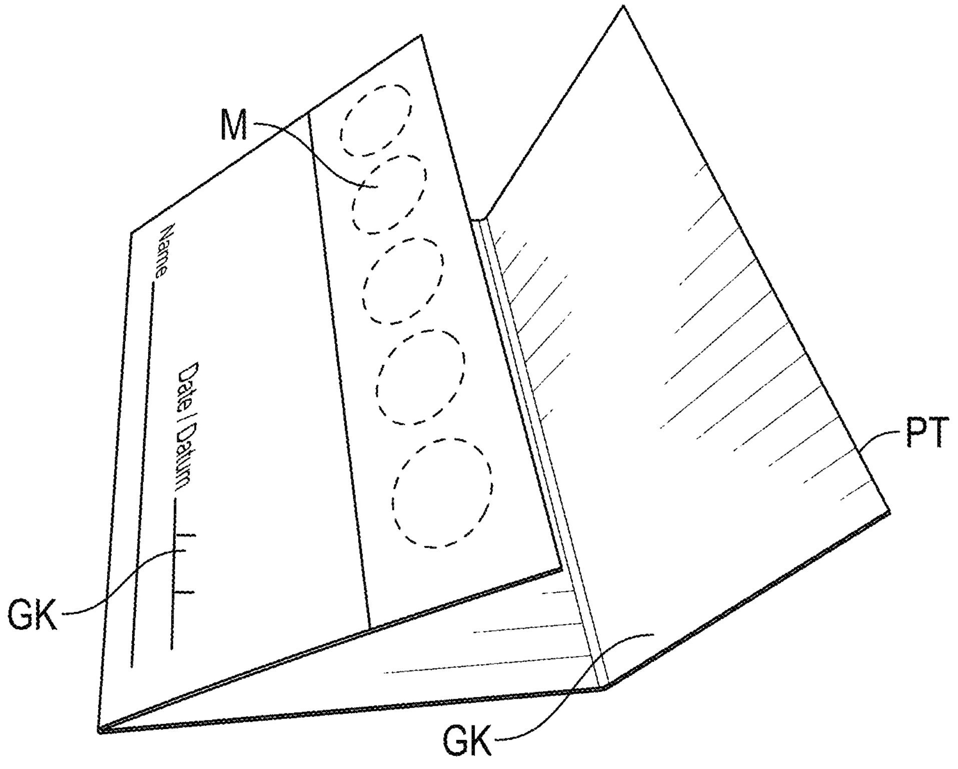
FIG. 1*c* shows the sample carrier depicted in FIG. 1*a* in an opened/unfolded configuration.

FIG. 1*c* shows the sample carrier PT in an unfolded configuration, wherein it can be seen that the sample carrier PT has a main body GK on which is mounted a membrane layer M. Viewing FIG. 1*c* and FIG. 1*b* together, it can be seen that it is preferably the main body GK, as part of the sample carrier PT, that is provided on its outer side A with the optically readable code C. The advantage of a sample carrier of this type, consisting of a main body GK and also a membrane layer M that is mounted on the main body GK, is that the main body GK, as part of the sample carrier PT, can be tucked into a holder of a receiving element and that there is no need to mechanically stress the membrane layer M for this purpose.

More particularly, the membrane layer M is a planar membrane layer, the main body GK being a planar main body that is foldable such that the membrane layer M, when the sample carrier PT is in its folded state, is covered by the folded main body GK. This is advantageous, since it means that the membrane layer M will not be damaged or subjected to mechanical stress when mounting the main body GK in a holder of a receiving element and also since the membrane layer M will be mechanically unaffected by friction or other mechanical influences due to components able to move around in the set or box. Any effect on the absorptive and analytical properties of the membrane due to mechanical action will thus be avoided. The purpose of the membrane layer is of course to later absorb a blood sample or blood components in dried form. In this process, it would for example be possible for abrasion of the surface of the membrane layer M due to movement of objects on the membrane layer M to counteract the standardized properties of the membrane layer, leading to a distortion of subsequent possible analytical properties of the membrane layer and thus of analytical results during a diagnostic procedure. This is avoided by provision of the main body and in particular by provision of a foldable main body GK such that the membrane layer M is covered by the folded main body.

Figure 3A:
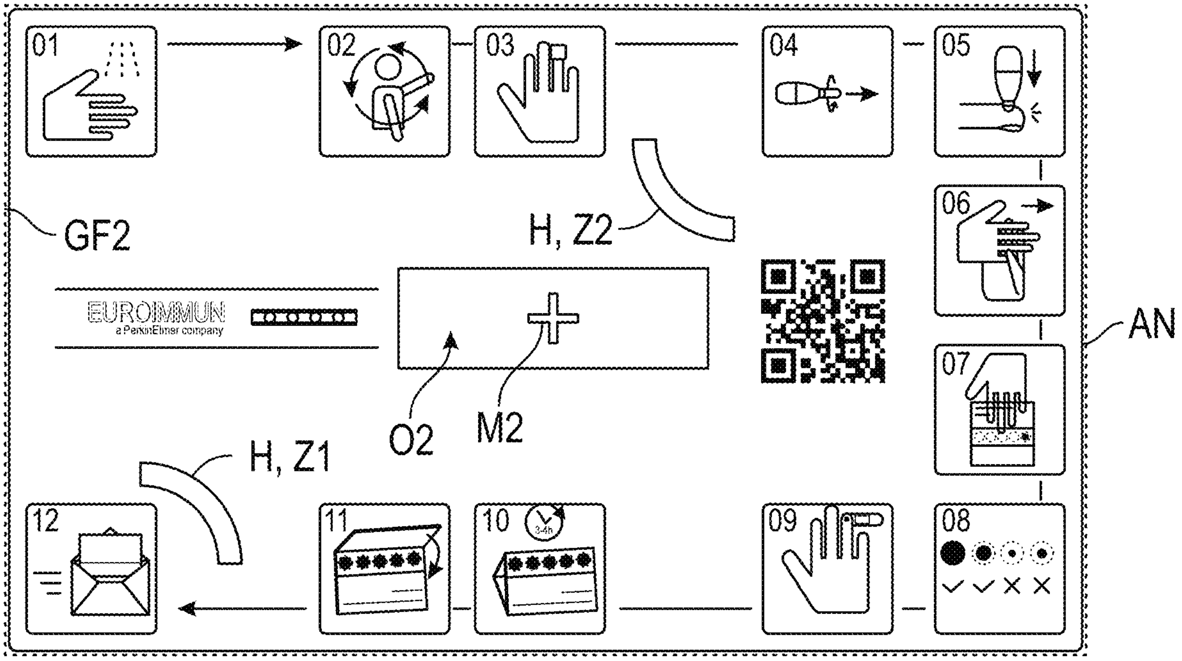
FIG. 3*a* shows a view of an embodiment of a receiving element.
Figure 3B:
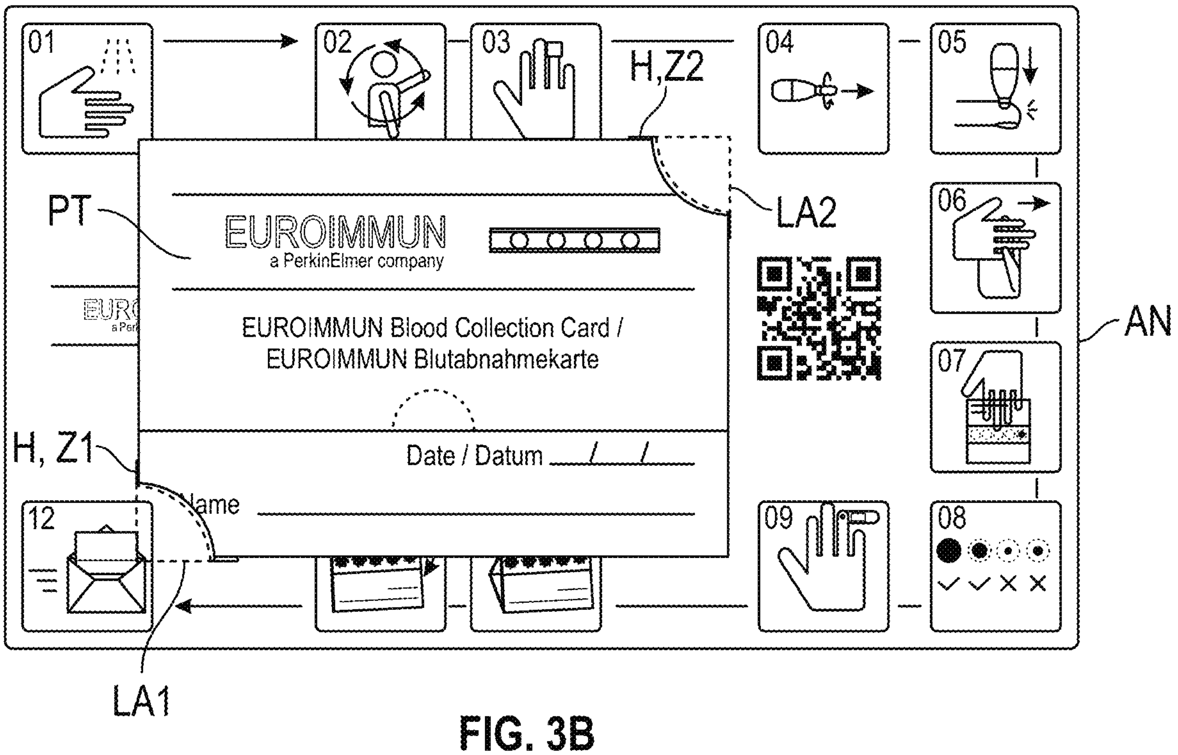
FIG. 3*b* shows a sample carrier inserted into the receiving element depicted in FIG. 3*a*.

FIG. 3*a* shows a receiving element AN having a base surface GF2. The receiving element AN has an opening O2. The receiving element AN additionally has a holding device H that is preferably made up of two punched holes Z1, Z2 in the receiving element AN. On the holding device/holder H may be mounted a sample carrier PT, as shown in FIG. 3*b*. More particularly, the holder H permits a mechanically reversible mounting of the sample carrier PT in the holder H such that the sample carrier PT may be removed again from the holder H without mechanical damage. This can preferably be done by mounting the sample carrier PT on the receiving element AN in such a way that one corner E1 of the sample carrier is inserted into one punched hole Z1, see FIG. 1*a*, then—with the receiving element AN slightly bent—inserting another corner E2 into another punched hole Z2 of the holder H and then bending the receiving element AN back again The receiving element AN is preferably mechanically flexible bendable.

This is particularly advantageous, since, in the event that a patient or a user such as a doctor wishes to subsequently remove the sample carrier from the box or from the receiving element, he/she can do this without mechanically damaging the sample carrier, all that is necessary being in particular to mechanically and flexibly bend the receiving element and pull the corners of the sample carrier out of the holder/out of the punched holes. If it were necessary for the sample carrier to be glued or stuck in or on the receiving element, the sample carrier could tear/rip on removal from the receiving element or from the holder and thereby sustain undesirable damaged, which is avoided according to the invention.

Because the sample carrier PT, with its rectangular base surface GFPT, see FIG. 1*a*, is able to be inserted/mounted into the holding device H, see FIG. 3*b*, or in respective punched holes Z1, Z2 in the receiving element AN, this can be done by means of the respective opposite corners E1, E2 of the sample carrier PT, since these can then be tucked into the holding device H/into the punched holes Z1, Z2.

It can be seen that, as shown in FIG. 1*a*, the corners E1, E2 are in particular arranged opposite one another in a symmetrical arrangement about a central point MPT on the base surface GFPT of the sample carrier PT.

The solution described in FIGS. 3*a* and 3*b* is particularly inexpensive, since all that is needed to form the holder H is two punched holes Z1, Z2 in the receiving element AN. Into these punched holes Z1, Z2 can be inserted the corresponding corners E1, E2 of the sample carrier PT, with the result that the sample carrier PT is adequately secured in its position without further materials, for example adhesive, being needed to secure the sample carrier. It is preferable here for the punched holes Z1, Z2 to be in the shape of a circle segment such that the corners E1, E2 of the sample carrier PT can be inserted into said punched holes Z1, Z2 particularly easily, since the circle-segment-shaped punched holes Z1, Z2 result in the formation of corresponding tabs LA1, LA2 that preferably are reversibly flexible or mechanically reversibly flexible. Such tabs LA1, LA2, as parts of the receiving element AN, can then be flexibly bent in order to mount the sample carrier PT on the receiving element AN.

Figure 3C:
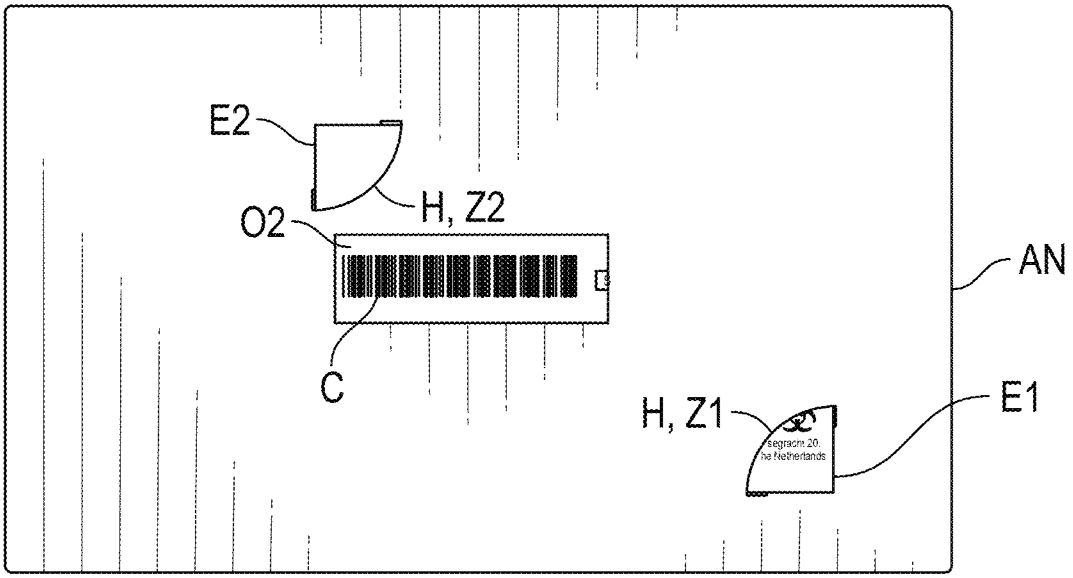
FIG. 3*c* shows the receiving element depicted in FIG. 3*a* with inserted/mounted sample carrier from a rear view.

FIG. 3*c* shows the receiving element AN from its reverse side with the sample carrier inserted therein such that the sample carrier is secured in its position by the holding device H by means of the preferably provided punched holes Z1, Z2 in its relative position so that the optical code C is visible through the opening O2 in the receiving element.

As can be seen from FIG. 3*a*, the opening O2 in the receiving element is arranged symmetrically about a central point M2, indicated by a cross, on the base surface GF2 of the receiving element AN. This base surface GF2 is preferably rectangular, but not square.

Figure 2A:
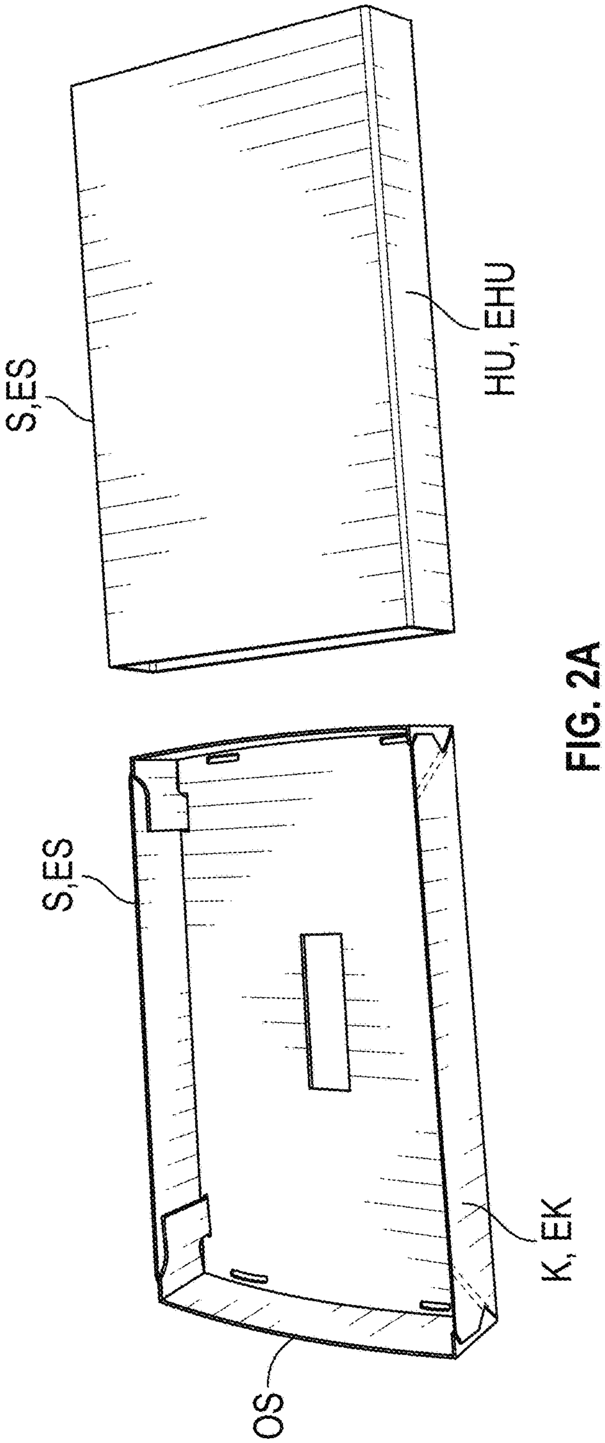
FIG. 2*a* shows a preferred embodiment of a box made up of a carton and a sleeve.
Figure 2B:
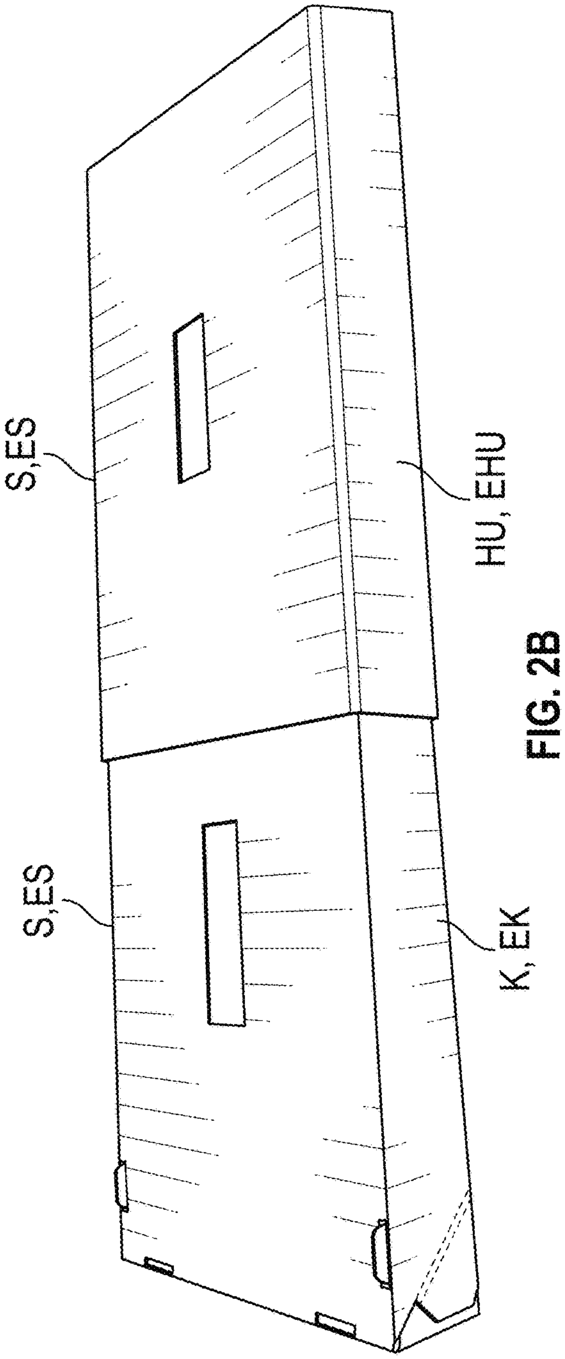
FIG. 2*b* shows the box depicted in FIG. 2*a* in another configuration state.

FIG. 2*a* shows a preferred embodiment of a box S in the form of a slide-in box ES, made up of a carton K in the form of a slide-in carton EK and of a sleeve HU in the form of a slide-in sleeve EHU. FIG. 2*b* shows the way in which a slide-in carton EK can here be slid into a slide-in sleeve EHU.

Figure 8A:
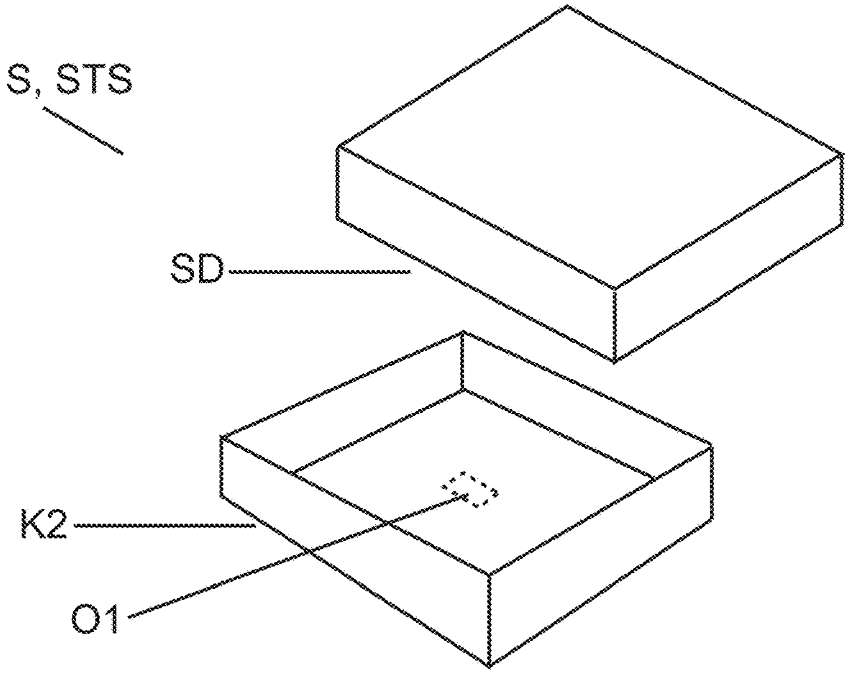
FIG. 8*a* shows an exemplary embodiment of the box in the form of a telescope box.

Alternatively, the box S is a telescope box STS, as shown in FIG. 8*a*, having a lid SD and a bottom carton K2. The opening O1 is in this case in the carton K3.

Figure 8B:
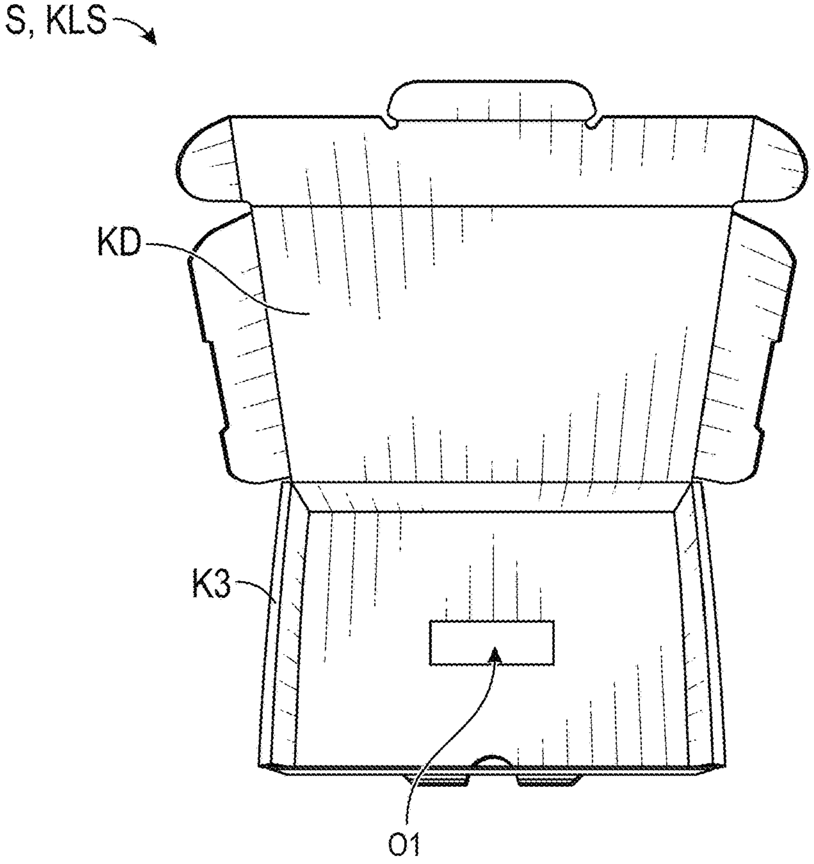
FIG. 8*b* shows an exemplary embodiment of the box in the form of a flip-top box.

Alternatively, the box S is a flip-top box KLS, as shown in FIG. 8*b*, having a carton/bottom carton K3 and a flip-top lid KD positioned thereon. The opening O1 is in this case in the carton K3.

The carton K/slide-in carton EK from FIG. 2*a* is open at its upper side OS. The box S is thus a cuboidal box having a cuboidal carton K, EK and a sleeve HU, EHU, it being possible alternatively to replace the sleeve by a lid not depicted here.

The carton K is preferably a collapsible carton. The carton K is preferably a four-point collapsible carton open at the top or a four-point box open at the top.

The box S and its components of the carton K, EK and also the sleeve HU, EHU or a lid is/are preferably made of paper, cardboard or paperboard in each case.

Figure 2C:
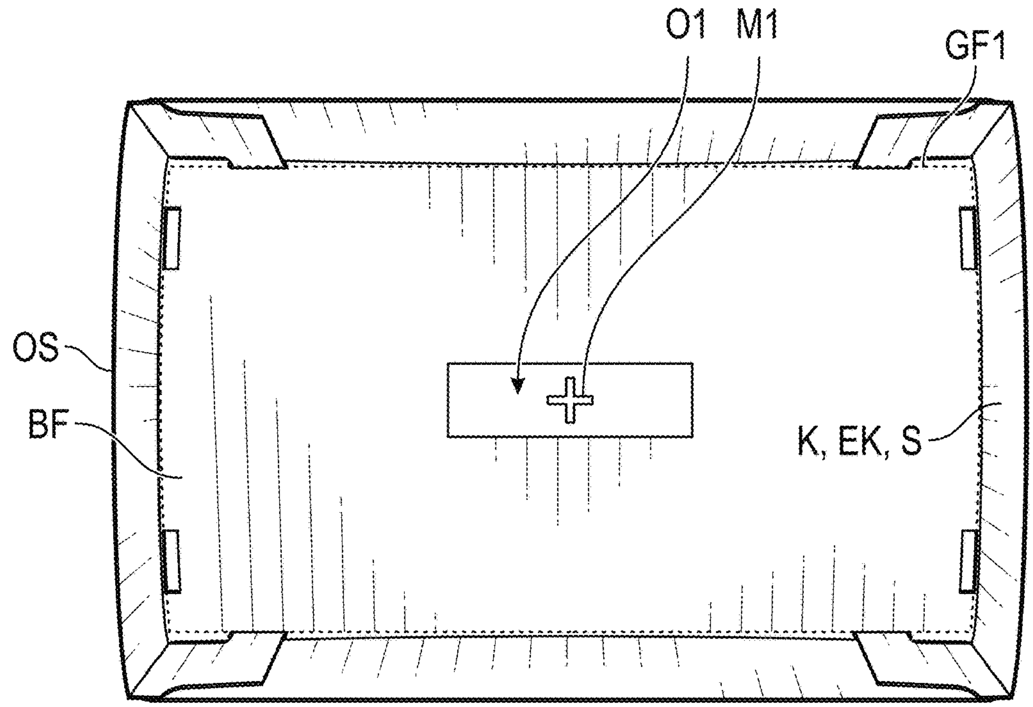
FIG. 2*c* shows a view of the carton depicted in FIG. 2*a*.

FIG. 2*c* shows the carton K, EK open at the top with its bottom surface BF, which has a base surface GF1. The carton K, EK is open at its upper side OS as already illustrated. The base surface GF1 is rectangular and has an opening O1. The bottom surface BF of the carton K, EK can be considered the bottom surface of the cuboidal box S.

Figure 2D:
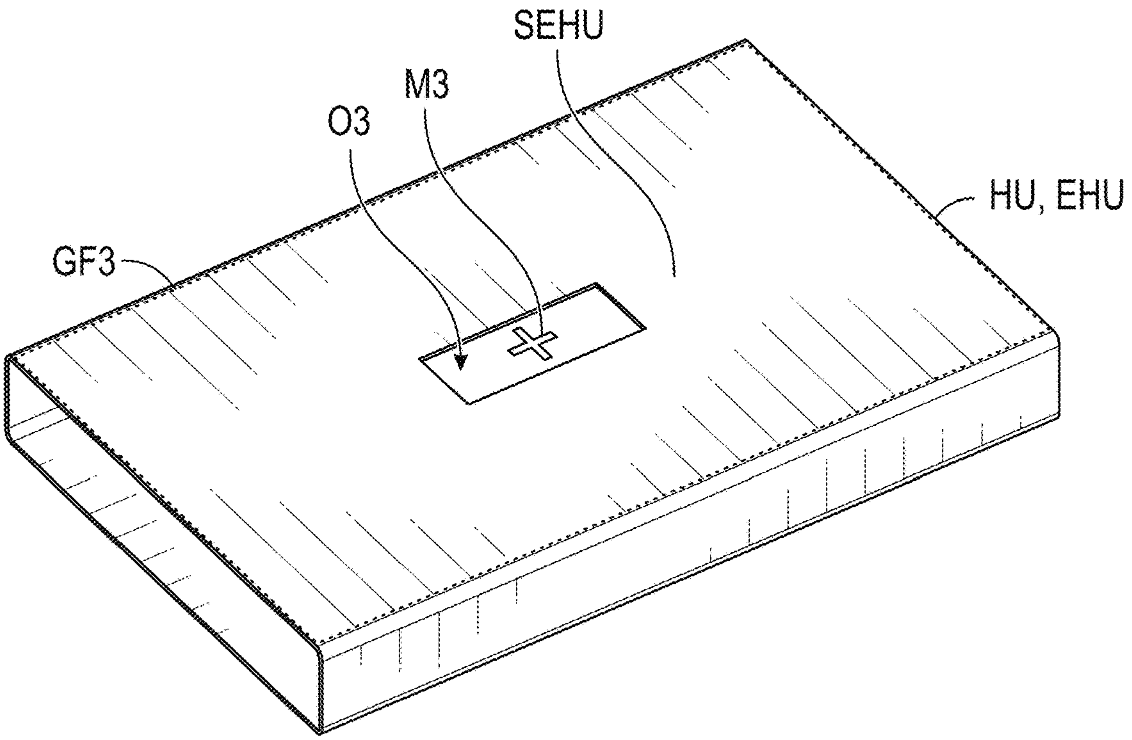
FIG. 2*d* shows an oblique view of the sleeve depicted in FIG. 2*a*.

FIG. 2d shows the slide-in sleeve EHU as an embodiment of a sleeve HU, the slide-in sleeve EHU having an opening O3 that is preferably arranged symmetrically about a central point M3, in particular a geometric central point M3, of a base surface GF3 of an outer side SEHU of the sleeve HU, EHU.

The base surface GF2 of the receiving element AN from FIG. 3a corresponds, particularly in respect of its dimensions, to the base surface GF1 of the bottom surface BF of the box S/carton K, EK from FIG. 2c.

The base surface GF2 of the receiving element AN from FIG. 3a is preferably rectangular.

As can be seen from FIG. 2c, the opening O1 of the box S/carton K, EK is arranged symmetrically about the central point M1 on the base surface GF1 of the bottom surface BF. Both the base surface GF1 and also the base surface GF2 from FIG. 3a are in each case preferably rectangular, but not square.

Figure 4A:
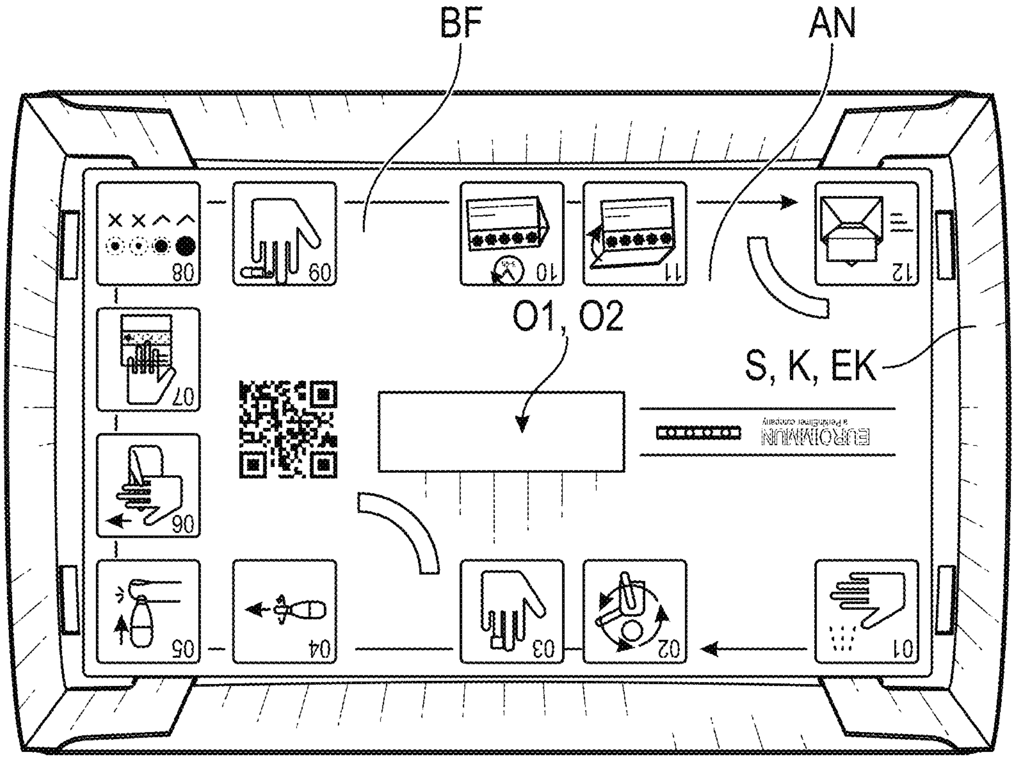
FIG. 4*a* shows the receiving element depicted in FIG. 3*a* inserted into the box/carton without sample carrier.

FIG. 4a shows the carton K, EK with inserted receiving element AN, which rests on the bottom surface BF of the carton K/box S. The openings O1 and O2 are designed so that they essentially overlap. Preferably, the openings O1, O2 are the same size.

Figure 4B:
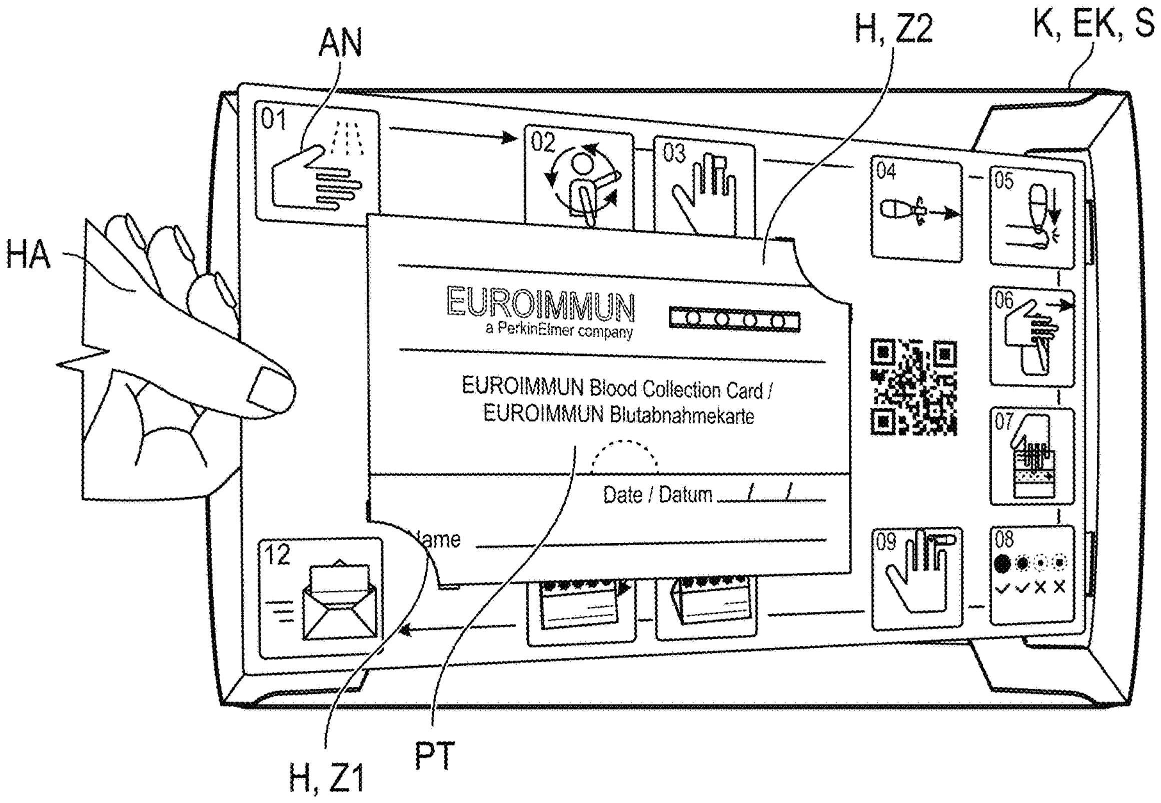
FIG. 4*b* shows a handling procedure in which the receiving element depicted in FIG. 3*a* is inserted into the box/carton with a sample carrier fastened thereto.
Figure 4C:
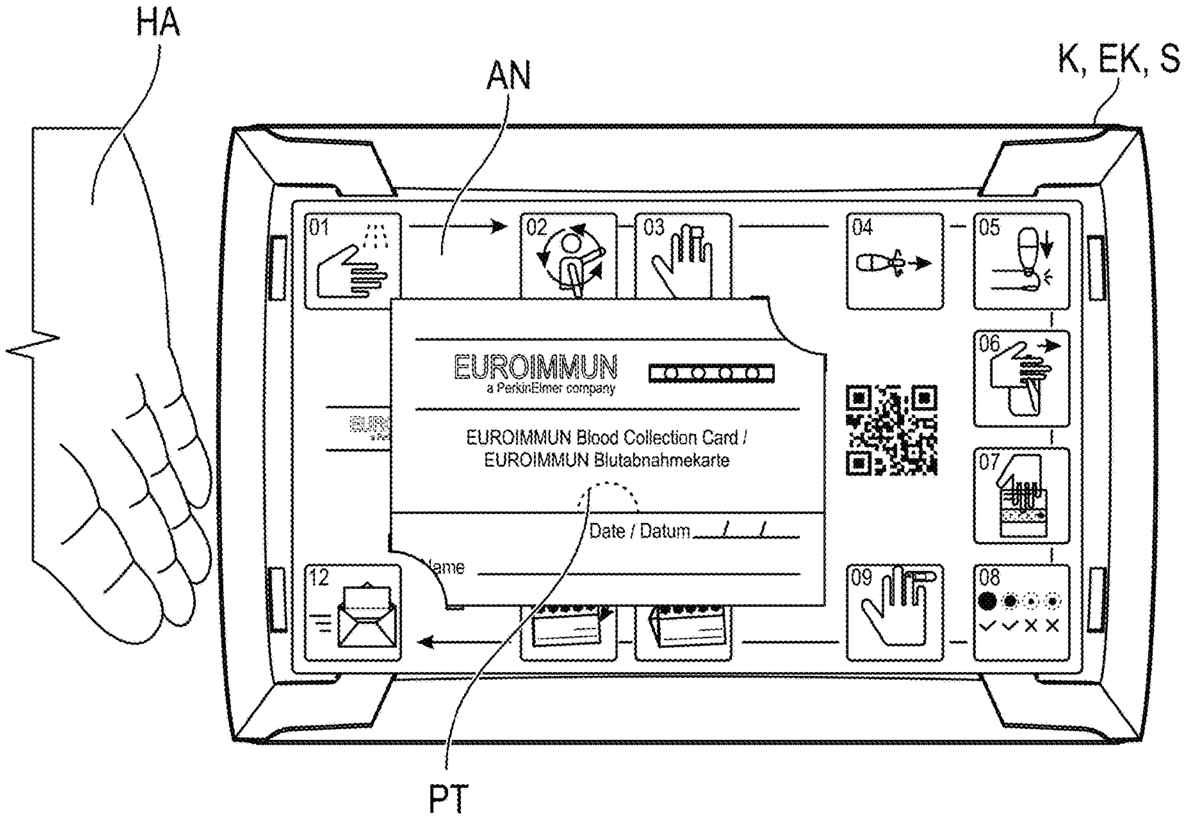
FIG. 4*c* shows a configuration in which the receiving element depicted in FIG. 3*a* is inserted into the carton/box with the sample carrier mounted on the receiving element.

FIG. 4b shows the step of inserting the receiving element AN into the box S/carton K, EK onto the bottom surface BF of the box S/carton K, EK, the sample carrier PT having been mounted in the holder H of the receiving element AN. When, by way of example, the receiving element AN is then manually inserted by hand HA into the box S/carton K, EK, this gives rise to a configuration as shown in FIG. 4c.

Figure 4D:
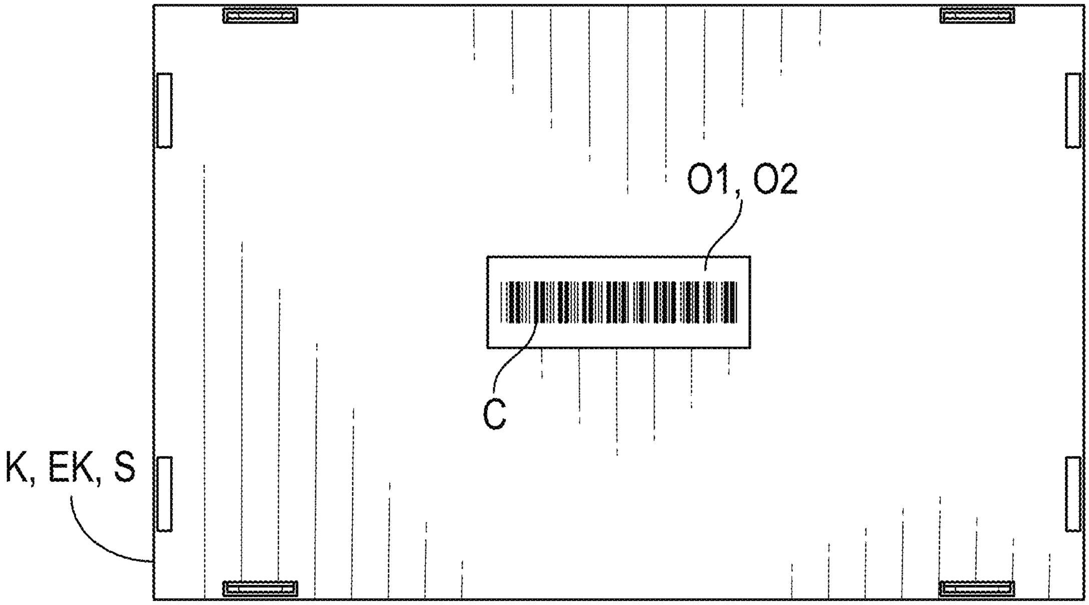
FIG. 4*d* shows a rear view of the carton/box with the receiving element and sample carrier present thereon inserted into the carton/box and with the code visible through the opening in the receiving element and in the bottom surface of the box/carton.

FIG. 4d shows the totality of the elements from FIG. 4c from a different view, from which it can be seen that, on mounting the sample carrier PT on the holder H and subsequently inserting the receiving element AN into the box S/onto the bottom surface BF of the box S, the optical code C is then visible through the first opening O1 in the bottom surface BF and also through the second opening O2 in the receiving element AN such that the code C can thus be recorded/read without problem.

Because the box S is made up at least of a separate carton K, EK open at the top and a separate closure in the form of a sleeve HU, EHU or else a lid not shown in more detail, it can be advantageous to first provide the receiving element AN with the sample carrier PT/first mount the sample carrier PT to the receiving element AN and then thereafter simply insert the receiving element AN, as depicted in FIG. 4b, into the box S/carton K, EK, thereby creating the advantageous configuration depicted in FIG. 4d. A box S of this type having a component of a carton K, EK and a sleeve HU, EHU or a lid is advantageous, since further components can then also be enclosed in the box.

Figure 5A:
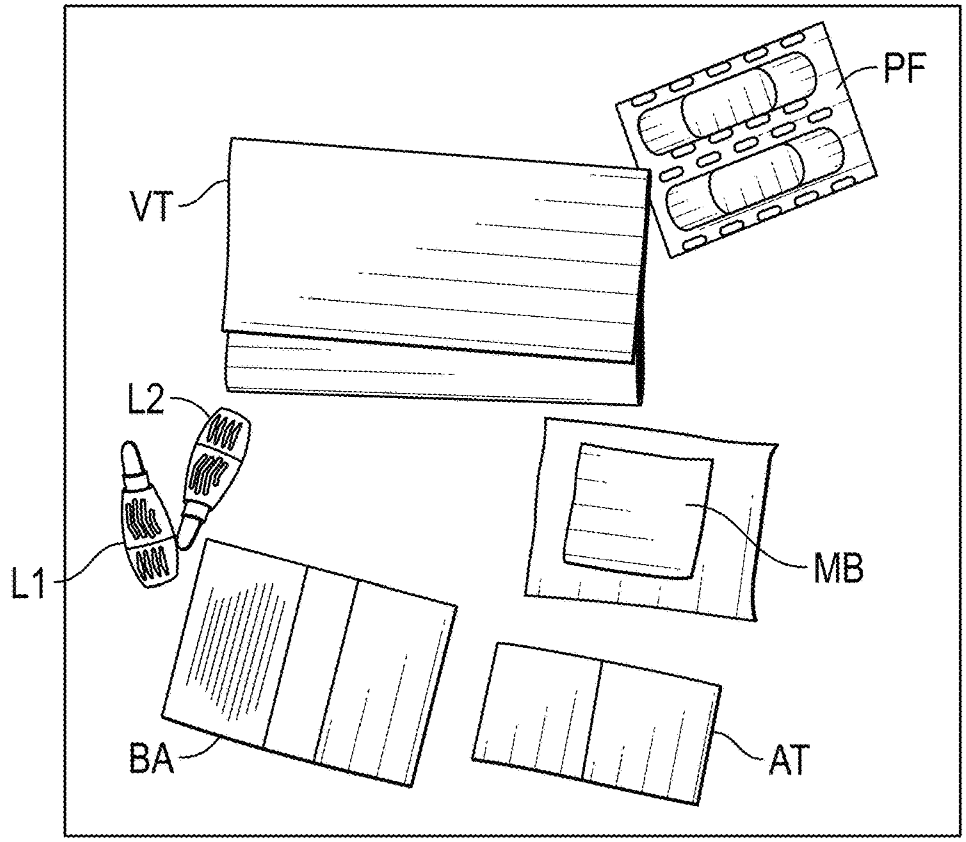
FIG. 5*a* shows various objects that may further be additionally enclosed in a box.

FIG. 5a shows further components/further objects such as one or more lancets L1, L2 and also a shipping bag VT. Further objects shown are also a plaster PF, a gauze bandage MB and also alcohol wipes AT or operating instructions BA. One or more such objects shown in FIG. 5a are normally shipped in a box together with a sample carrier and may therefore be included with the sample carrier. Such components/objects shown in FIG. 5a are necessary for the collection of samples of capillary blood from the patient and are then used by the patient him/herself or by a user such as a doctor to collect samples.

Figure 5B:
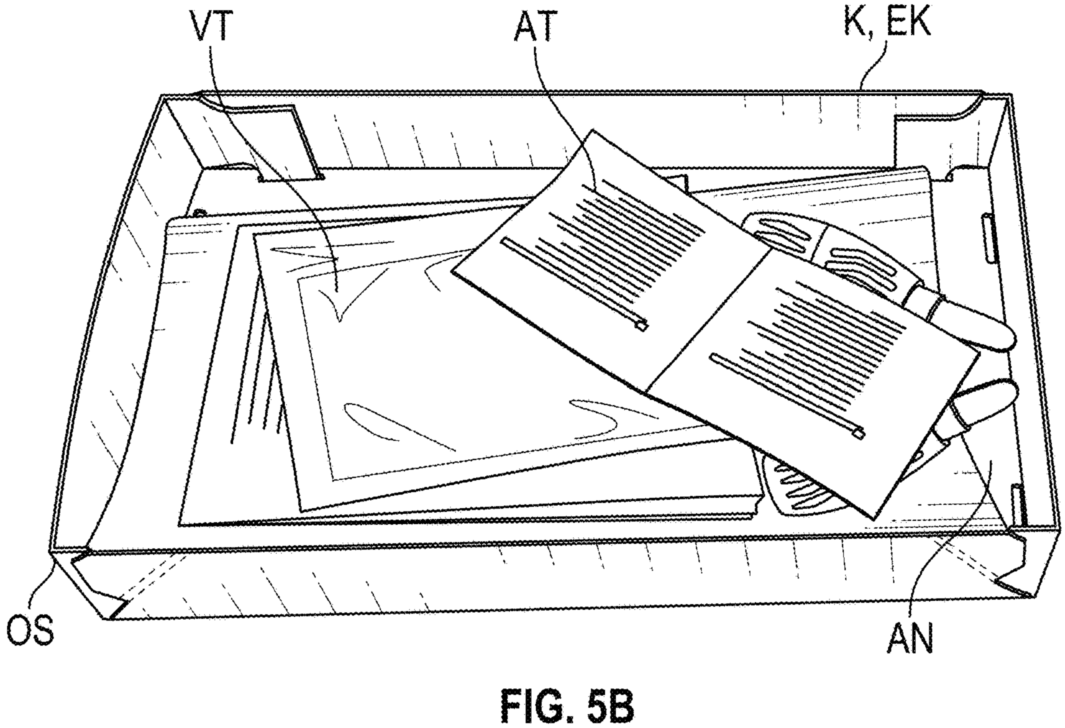
FIG. 5*b* shows a configuration with a receiving element inserted into the box and sample carrier mounted thereon, and also further objects.

FIG. 5b shows, with a receiving element AN inserted into the carton K, EK, that it is possible for further components such as a lancet L or a shipping bag VT to likewise be inserted into the box. Because the box S, ES has a carton K, EK that is open at the top, this means that at least one lancet L and at least one shipping bag VT can also be enclosed in said carton K, EK, wherein these further components L, VT too are retained inside the box S, ES by closing the carton K, EK by means of a sleeve HU, EHU or a lid.

Figure 5C:
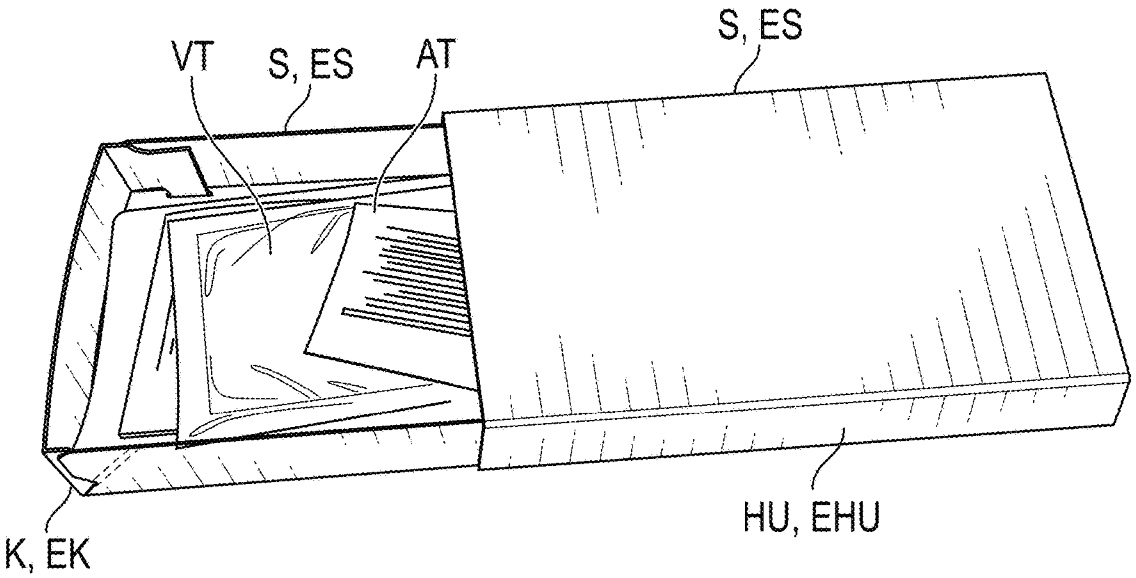
FIG. 5*c* shows a configuration and a handling procedure in which the carton of the box with objects inserted therein and receiving element of the box inserted therein is slid into a sleeve of the box.

FIG. 5c shows the slide-in carton EK being slid into the slide-in sleeve EHU, wherein the further components such as a lancet L or a shipping bag VT are then packed inside the box.

In the case of a slide-in box ES, the box ES is thus made up of a slide-in carton EK open at the top into which the receiving element AN can be inserted and which is then closed by sliding into the slide-in sleeve EHU as a component of the box S. This allows further components such as a shipping bag VT or a lancet L to be advantageously held and packed within the slide-in carton or box. The embodiment of the box S in the form of a slide-in box ES is particularly advantageous, since the slide-in carton EK can be simply slid into the slide-in sleeve EHU during assembly, with further components such as lancet L or shipping bag VT accordingly then being retained in the slide-in carton EK, even when said components L, VT are present loosely inside the box ESH, since such components L, VT will then be held inside the box ES by the slide-in sleeve EHU. Components such as an alcohol wipe AT shown in FIG. 5b that in an earlier packing stage from FIG. 5b could have been protruding upwards over the upper side OS of the carton K, EKU, are then advantageously pressed downwards into the interior of the slide-in carton by the slide-in sleeve EHU, as shown in FIG. 5c. In other words: The slide-in box ES is securely closed in that the slide-in box ES is automatically closed by simply sliding the slide-in carton EK into the slide-in sleeve EHU. When the box is designed as a telescope box or as a flip-top box, secure closing of the box would require the provision and operation of further closing elements such as a flip-top lid or a telescopic lid mechanically attached to a carton or held on by a clasp. The embodiment of the box in the form of a slide-in box ES is therefore particularly advantageous, since simple and quick handling during assembly of the set with further components such as a lancet L and a shipping bag VT is here particularly straightforward, safe and time-efficient. The set thus preferably comprises at least one lancet L and a shipping bag VT. Also disclosed is a set comprising all components.

There is also a further advantage in the embodiment of the box S in the form of a slide-in box ES in that it is then possible, for example during assembly in a first step as depicted in FIG. 5b, for components such as the receiving element AN with the sample carrier PT and also further components L, VT to first simply be inserted into the carton/slide-in carton EK, after which—instead of the slide-in carton EK being slid into the slide-in sleeve EHU as depicted in FIG. 5c—the carton EK from FIG. 5b can in an alternative assembly step be provided with the slide-in sleeve EHU by wrapping the slide-in carton EK with a cardboard element that is glued on one side so that the wrapping cardboard element forms the slide-in sleeve EHU. This also makes it possible to ensure, in a particularly advantageous manner, that components such as an alcohol wipe AT or a shipping bag VT from FIG. 5b, which may protrude upwards over the upper side OS of the carton EK, are pressed into the interior of the carton EK and held securely therein.

Figure 5D:
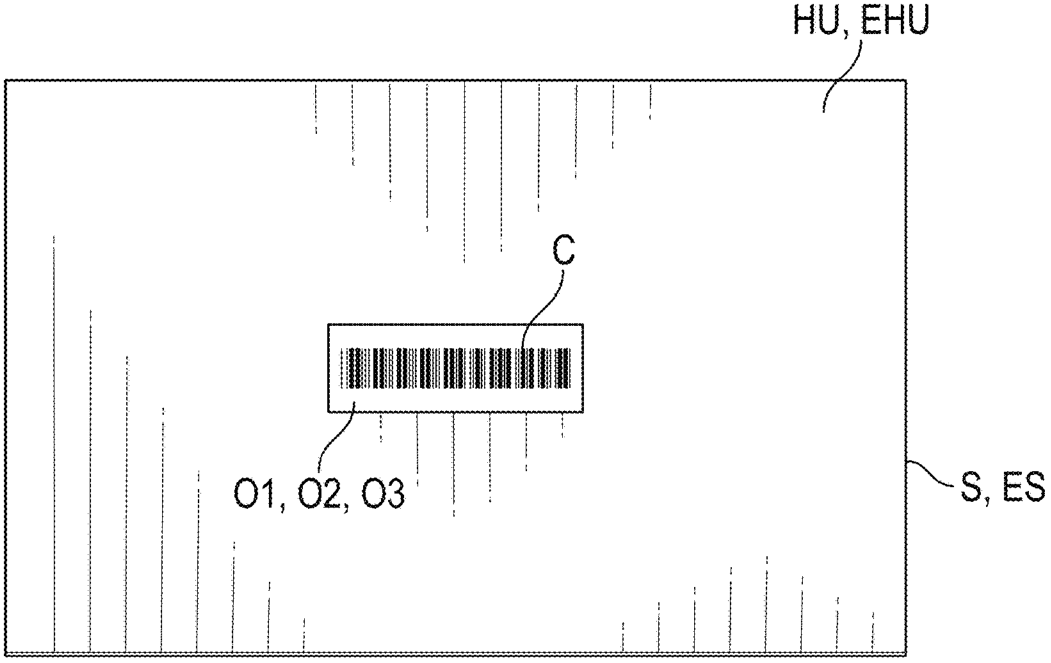
FIG. 5*d* shows a rear view of the box in a configuration state in which the sample carrier is mounted on the receiving element and in which the receiving element is present in the box such that the code is visible/readable through the opening in the receiving element, through the opening in the bottom surface of the carton and also through the opening in the sleeve/box.

FIG. 5d shows the box S, ES in the preferred embodiment of a slide-in box ES in a configuration in which the box S, ES is closed by sliding the slide-in carton EK into the slide-in sleeve EHU, the receiving element AN with sample carrier PT mounted thereto also being inserted into the box S, ES/carton K, EK. It can be seen clearly that, with the sample carrier PT mounted in the holder H of the receiving element AN and the receiving element AN inserted into the box S, ES/carton K, EK on the bottom surface and subsequent closure of the box S, ES, a correspondence of the opening O3 in the slide-in sleeve EHU as depicted in FIG. 2*d* then gives rise to a configuration in which the optical code C is visible through the opening O1 in the bottom surface BF, through the opening O2 in the receiving element AN and through the opening O3 in the slide-in sleeve EHU.

As already mentioned previously, the opening O1 in the box S, ES/carton K, EK is preferably arranged symmetrically about the central point M1 on the base surface GF1 of the bottom surface BF of the box S, ES/carton K, EK, it being further preferable that the opening O2 is arranged symmetrically about the central point M2 on the base surface GF2 of the receiving element AN, and the base surfaces GF1 and GF2 both being rectangular, but not square. This is particularly advantageous since, with the sample carrier PT inserted/mounted in or on the receiving element AN, the code C is always readable when the receiving element AN is inserted in the box S, ES/carton K, EK, because the rectangular, but not square, base surfaces GF1, GF2 give rise to only two possible configurations for inserting the receiving element AN, which in particular are rotated by 180° but wherein, in both these configurations, the code C of the sample carrier PT is always readable through the openings O1 and O2. In the exemplary embodiment of the box S in the form of a slide-in box ES, this is further ensured by the slide-in sleeve EHU having such an opening O3 that is symmetrical about the central point M3 on the base surface GF3 of the side SEHU of the slide-in sleeve EHU that has the opening O3, see FIG. 2*d*. The exemplary embodiment of the box in the form of a slide-in box thus also permits a 180° transposability of the configuration arrangement of the slide-in sleeve EHR with respect to the slide-in carton EK and also in particular with respect to the receiving element AN, wherein each of the possible configuration arrangements of the slide-in sleeve EHR with respect to the slide-in carton EK and in particular with respect to the receiving element AN allows the code to be read through the openings O1, O2, O3 when the box is closed. This avoids misconfigurations when fitting together the slide-in carton EK and slide-in sleeve EHU and in particular also the receiving element AN.

Figure 6A:
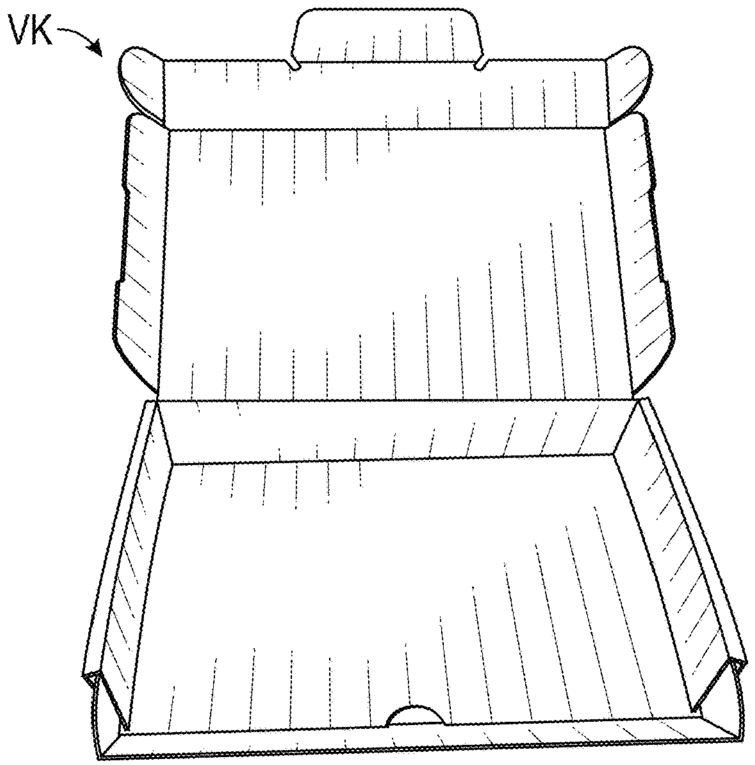
FIG. 6*a* shows a shipping carton.

FIG. 6*a* shows additionally a shipping carton VK/shipping box, preferably in the form of a flip-top box into which the box S can be inserted. Preferably, the set also comprises a shipping carton VK of this type. This is advantageous, since the shipping carton then provides mechanical protection and/or protection against soiling for the sample carrier PT and membrane layer M thereof and also for the barcode C.

Figure 6B:
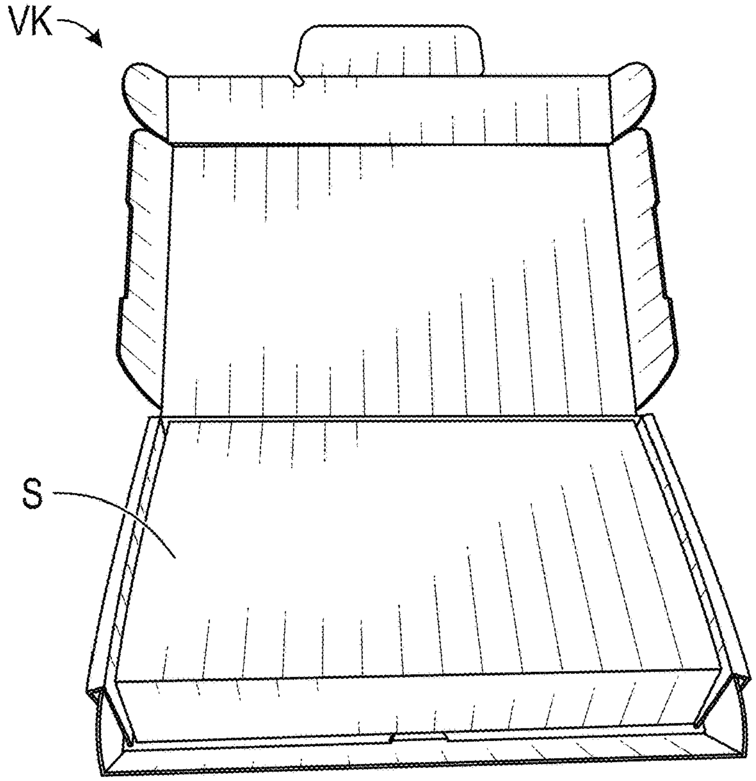
FIG. 6*b* shows a box inserted in the shipping carton.

FIG. 6*b* shows in this regard a box S inserted in the shipping carton VK.

Figure 7A:
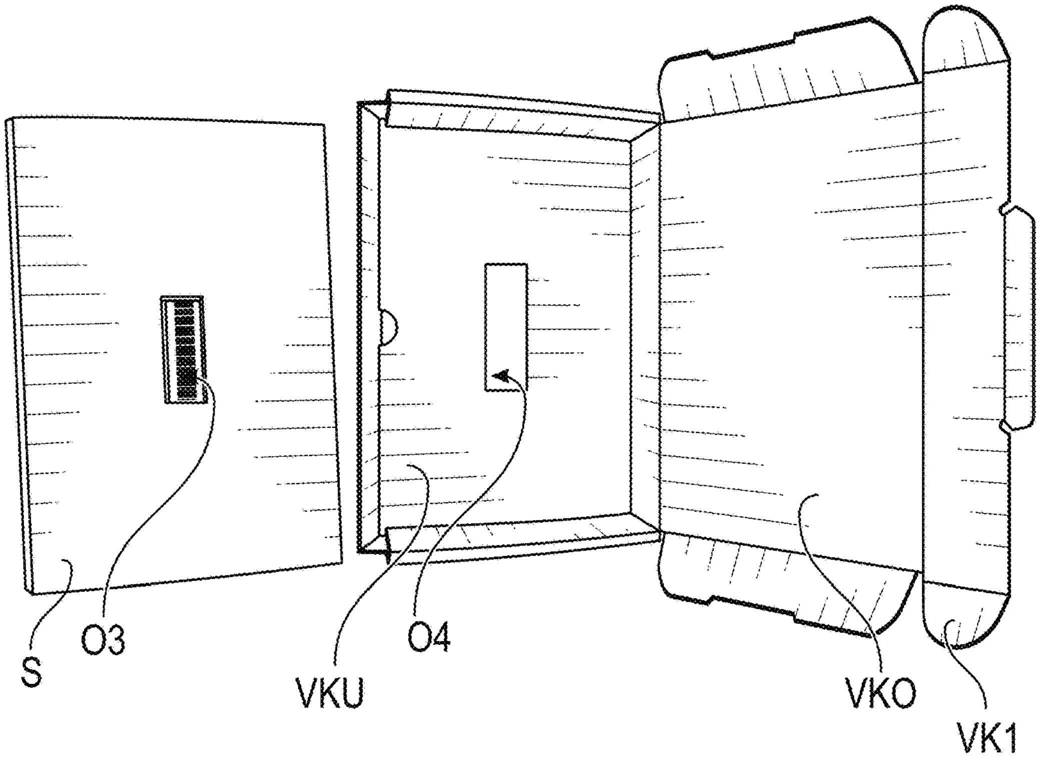
FIG. 7*a* shows a shipping carton having a further opening and a box.
Figure 7B:
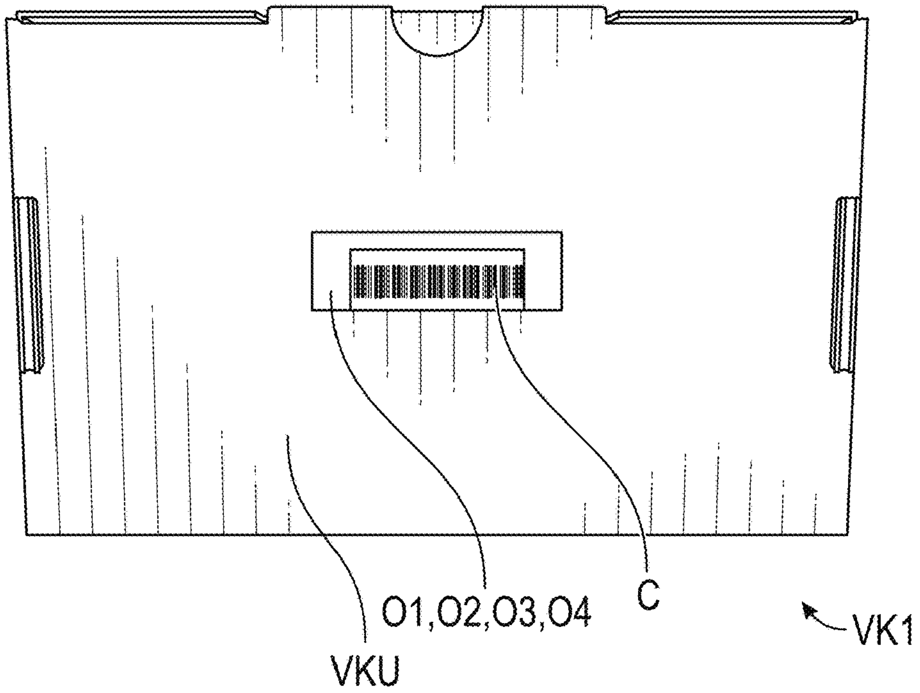
FIG. 7*b* shows the shipping carton having the further opening and box inserted therein.

FIG. 7*a* shows a preferred embodiment of the shipping carton VK1 that has an opening O4 on its underside VKU or its upper side VKO that preferably corresponds to the first and the second opening O1, O2 and also preferably to the third opening O3. FIG. 7*b* shows in this regard the carton VK1 from its underside VKU, wherein the code C is readable through the openings O1, O2, O3, O4.

Figure 7C:
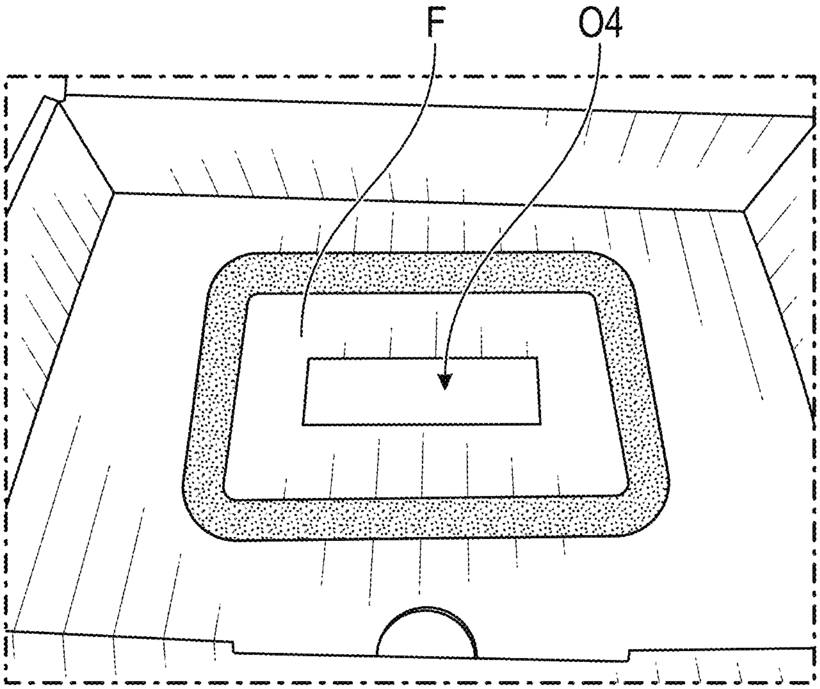
FIG. 7*c* shows the further opening in the shipping carton depicted in FIG. 7*a* with transparent film positioned thereover.
Figure 7D:
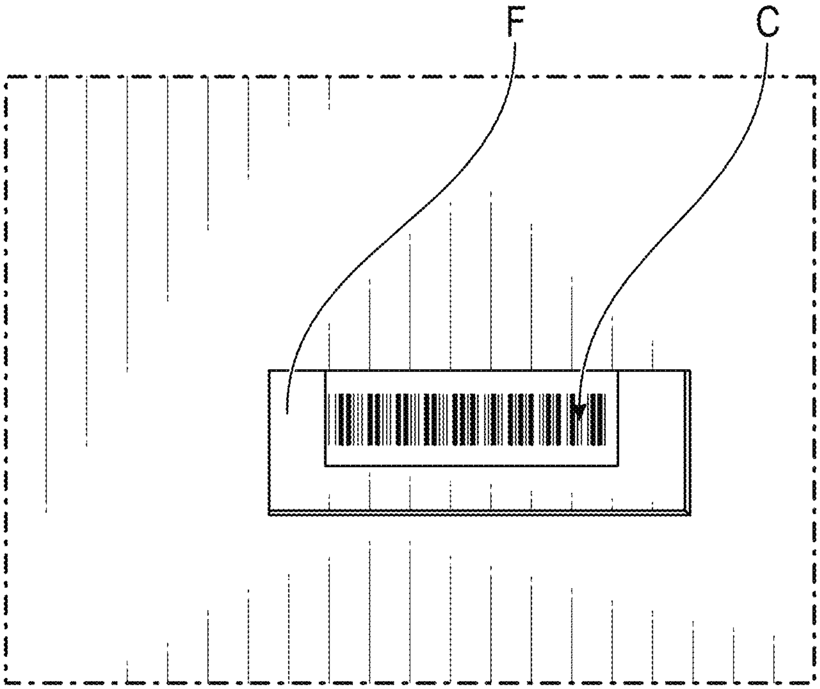
FIG. 7*d* shows a rear view of the shipping carton with box inserted and code visible through the film.

As shown in FIG. 7*c*, the opening O4 is preferably covered by an optically transparent film F so that the code C can be read even when the box S is inserted in the shipping carton VK1, as shown in FIG. 7*d*. A transparent film F at the opening O4 prevents ingress of dirt into the interior of the shipping carton VK1 and into the box S and thence to the sample carrier PT and membrane layer M thereof. Therefore, the whole set including the shipping carton VK1 can be preassembled and stored so that, when required, a laboratory worker in the laboratory can merely take the whole set out of storage and can scan/read the optical code through the opening O4 in the shipping carton VK1.

In a preferred embodiment, the code C is arranged centrally or symmetrically about a central point MPT, in particular a geometric central point MPT, on a base surface GFPT of the sample carrier, preferably of the folded-up sample carrier PT. In particular, the holder H too is then arranged symmetrically about the central point M2 on the base surface GF2 of the receiving element AN, in particular the punched holes Z1, Z2. Here, too, there is then the advantage of 180° variability during assembly/when mounting the sample carrier PT on the receiving element AN while ensuring that the code can be read through the opening O1 in the receiving element and in particular further openings O2, O3 and/or O4.

All references, including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A set comprising:

a planar sample carrier comprising:

an absorbent membrane layer suitable for absorbing liquid blood components, wherein at least a portion of the blood components is able to dry in the absorbent membrane layer; and an outer side comprising an optically readable code;

a closable cuboidal box having a bottom surface comprising a rectangular base surface and a first opening;

a separate planar receiving element comprising:

a separate holder for the planar sample carrier, wherein the holder permits a mechanically reversible mounting of the planar sample carrier in the holder such that the planar sample carrier may be removed from the holder without mechanical damage;

a base surface that corresponds to the rectangular base surface of the bottom surface; and a second opening, wherein, together, the second opening and the holder are designed such that, on mounting the sample carrier in the holder and subsequently inserting the receiving element into the cuboidal box on the bottom surface of the cuboidal box, the optically readable code is visible through the first opening in the bottom surface and also through the second opening in the planar receiving element.

2. A set according to claim 1, wherein the cuboidal box is made up of a cuboidal carton and of a sleeve or a lid, wherein the cuboidal carton is open at the top on its upper side, and wherein the cuboidal carton can be closed through the sleeve or the lid.

3. A set according to claim 2, wherein the cuboidal box is a slide-in box made up of a slide-in carton and of a slide-in sleeve, wherein the slide-in sleeve has a third opening that corresponds to the first opening and to the second opening such that:

on mounting the planar sample carrier in the holder, subsequently inserting the receiving element into the slide-in carton on its bottom surface, and subsequently sliding the slide-in carton into the slide-in sleeve, the optically readable code is visible through the first opening in the bottom surface, through the second opening in the receiving element and through the third opening in the slide-in sleeve.

4. A set according to claim 1, wherein:

the sample carrier comprises a main body, the absorbent membrane layer is mounted on the main body, and the main body is also provided on an outer side with the optically readable code.

5. A set according to claim 4, wherein:

the absorbent membrane layer is a planar membrane layer, and the main body is a planar main body that is foldable such that the membrane layer is covered by the folded main body.

6. A set according to claim 1, wherein:

the planar sample carrier has a rectangular base surface, and the holder is made up of at least two punched holes in the receiving element, into which can be tucked respective opposite corners of the planar sample carrier.

7. A set according to claim 1, wherein:

the first opening is arranged symmetrically about a central point on the base surface of the bottom surface, the second opening is arranged symmetrically about the central point on the base surface of the planar receiving element, and the base surfaces are rectangular, but not square.

8. A set according to claim 1 further comprising at least one lancet and at least one shipping bag for shipment of the planar sample carrier.

9. A set according to claim 1 further comprising a shipping carton or a shipping box, into which the cuboidal box can be inserted.

10. A set according to claim 9, wherein the shipping carton has a fourth opening on its underside or its upper side that corresponds to the first opening and the second opening.

11. A set according to claim 1, wherein the optically readable code is positioned centrally about a central point on the base surface of the planar sample carrier.

12. A set according to claim 1, wherein:

the planar sample carrier is mounted in the receiving element, the planar receiving element is inserted into the cuboidal box, and the optically readable code is visible through the first opening in the bottom surface and also through the second opening in the planar receiving element.

13. A set according to claim 12, wherein:

the cuboidal box is a slide-in box made up of a slide-in carton and a slide-in sleeve, the slide-in sleeve has a third opening that corresponds to the first opening and the second opening, the slide-in carton is slid into the slide-in sleeve, and the optically readable code is visible through the first opening in the bottom surface, through the second opening in the planar receiving element and through the third opening.

* * * * *